United States Patent [19]

Deville

[11] Patent Number: 4,607,512
[45] Date of Patent: Aug. 26, 1986

[54] PROCESS FOR MANUFACTURING A COOKERY VESSEL

[75] Inventor: Jean-Pierre Deville, Poisy, France

[73] Assignee: SEB S.A., Selongey, France

[21] Appl. No.: 755,716

[22] Filed: Jul. 16, 1985

[30] Foreign Application Priority Data

Jul. 20, 1984 [FR] France ................... 84 11516

[51] Int. Cl.$^4$ .................. B21D 22/00; B21D 53/00
[52] U.S. Cl. .......................... 72/46; 29/424; 29/527.2
[58] Field of Search ............. 72/41, 46; 29/527.2, 29/527.4, 424; 220/455, 456, 457, 458

[56] References Cited

U.S. PATENT DOCUMENTS

| | | | |
|---|---|---|---|
| 3,008,601 | 11/1961 | Cahne | 220/457 X |
| 3,523,817 | 8/1970 | Reiss | 220/457 X |
| 3,593,702 | 7/1971 | Zigomalas | 220/458 X |
| 3,909,591 | 9/1975 | Ulam | 220/457 X |
| 3,930,806 | 1/1976 | Racz | 220/458 X |

FOREIGN PATENT DOCUMENTS

| | | |
|---|---|---|
| 628439 | 5/1963 | Belgium . |
| 720974 | 3/1969 | Belgium . |
| 567388 | 1/1933 | Fed. Rep. of Germany . |
| 1454103 | 12/1968 | Fed. Rep. of Germany ...... 220/458 |
| 1579441 | 5/1971 | Fed. Rep. of Germany . |
| 1600248 | 8/1970 | France . |
| 2027206 | 9/1970 | France . |
| 1329980 | 9/1973 | United Kingdom . |

Primary Examiner—E. Michael Combs
Attorney, Agent, or Firm—Young & Thompson

[57] ABSTRACT

A process for manufacturing a cooking vessel is disclosed wherein a vessel is formed by applying an enamel coating to a central part of a flat metal disc blank, the enamel coating is baked, a non-stick coating based on a fluorinated polymer is applied to both faces of the enamelled disc blank, the disc blank is deep-drawn into a desired vessel shape having a flat bottom and a side wall, and the non-stick coating covering the enamelled part of the vessel is then removed.

3 Claims, 5 Drawing Figures

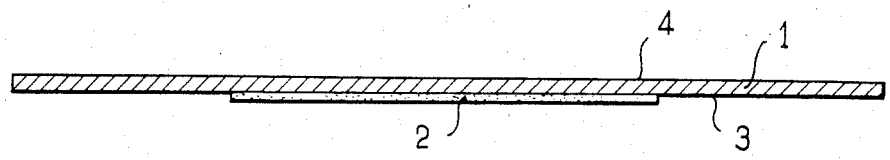
FIG_1
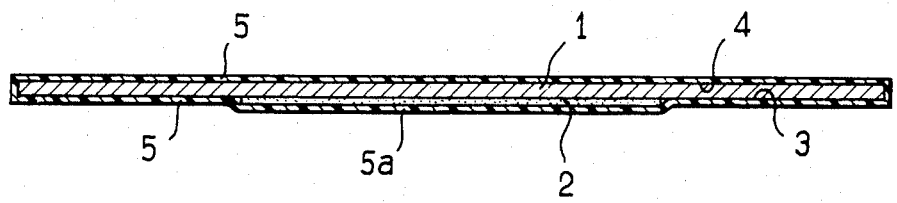
FIG_2
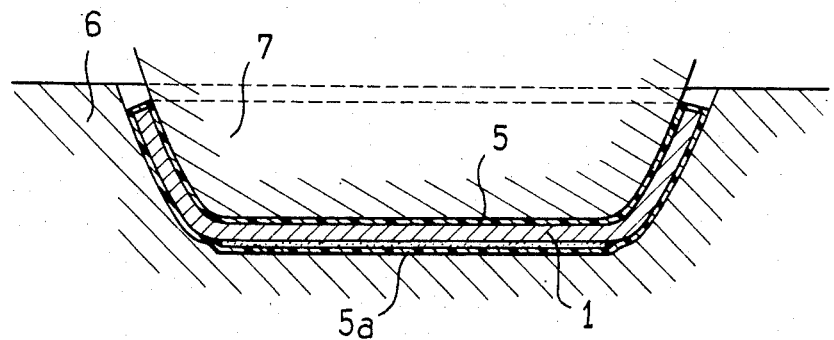
FIG_3

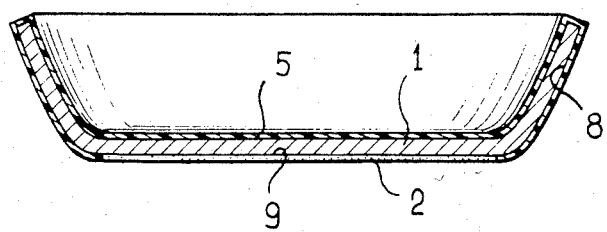
FIG_4
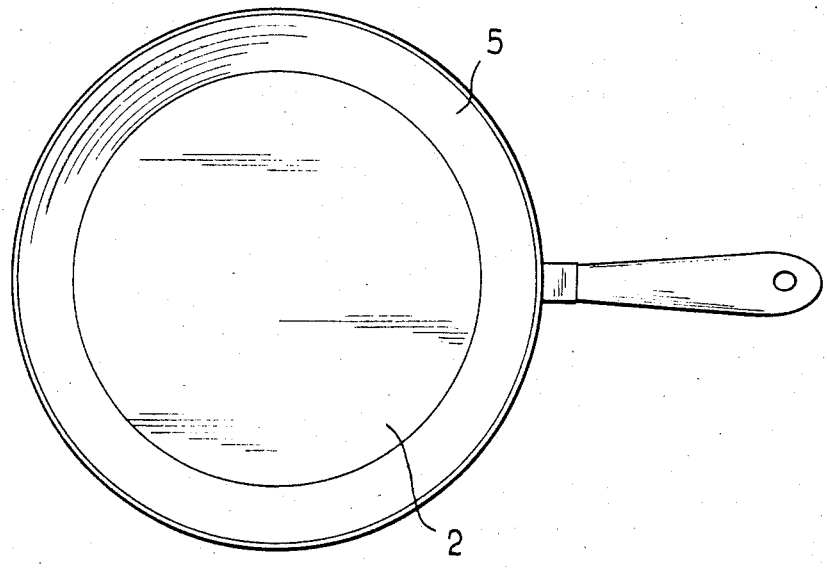
FIG_5

PROCESS FOR MANUFACTURING A COOKERY VESSEL

The present invention relates to a process for manufacturing a cookery vessel comprising a flat bottom and a side wall, the interior of the vessel and the outer face of the side wall being coated with a nonstick coating based on a fluorinated polymer, such as polytetrafluoroethylene (PTFE).

The invention also relates to cookery vessels produced by deep-drawing, and in particular obtained by the aforesaid process.

In order to manufacture such cookery vessels, the known procedure is as follows (see in particular French Patent No. 1,156,405):

A metal disc, for example of aluminium, is subjected to attack by acid so as to form on both faces of this disc a multiplicity of microcavities intended to form a key for the coating of nonstick material;

An aqueous dispersion of a fluorinated polymer, such as PTFE, is applied to both faces of this disc;

This coating is baked;

The disc coated in this manner is deep-drawn between a die and a punch to the shape desired for the cookery vessel, whereupon the coating of fluorinated polymer is removed by machining from the outer face of the bottom of the vessel.

This last-mentioned operation is indispensable because the fluorinated polymer could not withstand direct contact with the electric hotplate or the flame of the gas cooker burner.

However, this operation entails the following disadvantages:

Firstly, the removal of this coating of fluorinated polymer by machining necessarily results in a reduction of the thickness of the metal forming the bottom of the vessel.

This reduction of thickness affects the rigidity of the bottom of the vessel, so that the latter tends to be deformed through the action of the abrupt variations of temperature to which it is subjected.

For this reason it is necessary to use at the start a disc having a thickness greater than would normally be required if the bottom were not machined in this way. This machining operation, which is in itself expensive, therefore entails increased cost of raw material.

Furthermore, the bottom of these vessels, where the metal is left bare, is very easily stained and is difficult to clean, so that these vessels soon acquire an unattractive appearance on the outside, which is regrettable because all the other surfaces of these vessels, being coated with nonstick material, are easy to clean and consequently remain perfectly bright.

The aim of the present invention is to obviate the disadvantages mentioned by providing a process which makes it possible to obtain a cookery vessel of which all the surfaces, including the bottom surface, are very easy to clean, while in addition this bottom has improved resistance to deformation without it being necessary to increase the thickness of the disc used for making this vessel.

According to the invention, the process of the invention for the manufacture of a cookery vessel comprising a flat bottom and a side wall, and whose interior and outer face of the side wall are coated with a nonstick material based on a fluorinated polymer, is characterized by the following stages:

a coating of enamel is applied to the central part of a metal disc, corresponding to the outer face of the bottom of the vessel which it is desired to produce, after the enamel has been baked, the nonstick coting based on fluorinated polymer is applied to both faces of the disc, including the enamelled part;

after this nonstick coating has been baked, the disc is deep-drawn to the shape desired for the vessel, and the nonstick coating covering the enamelled part is removed.

The application of a coating of enamel to the part of the disc which is intended to form the outer face of the bottom of the vessel, before applying the fluorinated polymer coating, then enables the fluorinated polymer to be removed very easily from the zone in which it covers the enamel coating, because this fluorinated polymer adheres hardly at all to the enamel.

Consequently, no machining is required for removal of the fluorinated polymer from the bottom of the vessel.

The thickness of the metal of the vessel is consequently not affected. In addition, because of this enamel coating covering the bottom of the vessel, all the surfaces of the latter are easy to clean.

Furthermore, this enamel coating strengthens the bottom of the vessel, so that the latter has improved resistance to deformation caused by abrupt variations of temperature.

Numerous processes are known for enamelling cookery vessels. In all these processes the enamel is applied after the deep-drawing of the vessel, because the enamel coating is brittle and would not withstand the bending and tensile stresses occurring during the deep-drawing.

In the case of the process according to the invention, the enamel coating is applied solely to the part corresponding to the flat bottom of the vessel; for this reason this enamel coating is not subjected, during the deep-drawing, to any bending or tensile stress liable to crack it.

According to another aspect of the invention, the cookery vessel produced by deep-drawing, which comprises a flat bottom and a side wall and whose interior and outer face of the side wall are coated with a fluorinated polymer based nonstick material, is characterized in that the outer face of the bottom is covered with a coating of enamel.

Other features and advantages of the invention will emerge from the description given below.

In the accompanying drawings, given by way of non-limitative examples:

FIG. 1 is a view in diametrical section of a metal disc covered in the central part with an enamel coating on one face.

FIG. 2 is a similar view to FIG. 1, showing the disc coated on both faces with fluorinated polymer.

FIG. 3 is a view in longitudinal section showing the deep-drawing of the disc to the shape of a frying-pan.

FIG. 4 is a view showing the frying-pan obtained after deep-drawing and removal of the fluorinated polymer from the outer face of the bottom.

FIG. 5 is a plan view showing the underside of the completed frying-pan.

In order to produce the frying-pan shown in FIG. 5, the procedure is as described below.

After the surface of the disc 1, which is for example of aluminium, has been degreased and pickled, an enamel composition 2 (see FIG. 1) is applied to the central part of the face 3 of the disc, corresponding to the outer face of the bottom of the frying-pan which it is desired to produce.

This enamel composition 2 may be a conventional enamel composition for aluminium. This enamel coating 2 may also be composed of two superimposed layers of enamel which are baked in a single operation by the process described in French Patent Application No. 83 06178 filed on the 15th April 1983.

After the enamel coating 2 has been baked at a temperature between 550° and 600° C., the disc 1 is subjected to chemical treatment using an acid to form on the two faces 3 and 4 of the disc a multiplicity of microcavities intended to form a good adhesion surface for the fluorinated polymer coating. This process of chemical attack may be that described in French Patent No. 1 156 405.

After this operation a coating 5 of fluorinated polymer, such as PTFE, is applied to the two faces 3 and 4 of the disc 1, including the enamel coating 2 (see FIG. 2). For this purpose the disc 1 is coated with an aqueous dispersion of fine particles of fluorinated polymer, whereupon the resulting coating is baked in order to weld the polymer particles to one another and to obtain a continuous covering.

In the case of PTFE, the baking temperature is of the order of 500° C.

After the nonstick coating 5 has been baked, the coated disc is deep-drawn (see FIG. 3) to obtain the shape desired for the frying-pan. For this purpose the coated disc is placed between a die 6 and a punch 7, whose shapes are complementary, and a force directed towards the die is applied to the punch 7.

During this operation the enamel coating 2 suffers no damage, because it has been applied to the flat part of the disc and this part is not subjected to any bending or tensile forces.

This enamel coating 2 is subjected solely to compression, the effects of which are attenuated by the presence of the PTFE coating 5a situated between the die 6 and the enamel coating 2, thus avoiding any direct contact between the enamel and the metal of the die.

It is then sufficient to remove the PTFE coating 5a covering the enamel coating 2. This operation is very easy, because this PTFE coating 5a adheres only weakly to the enamel coating 2, so that no machining is necessary: simple scraping or polishing is sufficient.

A frying-pan is thus obtained whose interior and side face 8 (see FIG. 4) are covered with a coat 5 of PTFE, while the outer face 9 of the flat bottom is covered with an enamel coating 2.

This enamel coating 2 imparts to the frying-pan the following main technical advantages:

on the one hand, this enamel coating 2 eliminates all machining of the bottom of the frying-pan to remove the PTFE coating, so that the original thickness of the disc is retained;

in addition, this enamel coating 2 strengthens the bottom of the frying-pan and enables the latter to withstand more successfully the thermal stresses which tend to deform it;

and on the other hand, because of this enamel coating, the frying-pan is easy to clean on all its surfaces, so that these surfaces retain a bright, new appearance throughout a very long useful life.

The invention is obviously not limited to the example just described, and numerous modifications may be made to this example without going beyond the scope of the invention.

Thus, the process according to the invention may also be effected by subjecting the disc 1 to chemical treatment before the enamel coating is applied. In this case the chemical treatment serves at the same time to provide a good adhesion surface both for the enamel coating 2 and for the PTFE coating 5.

Furthermore, since this chemical attack takes place before the enamel coating 2 is applied, there is no risk of damage to the enamel through this attack.

The invention is obviously applicable to any cookery vessels other than frying-pans, such as saucepans, omelette pans, pressure-cookers, and the like.

I claim:

1. Process for manufacturing a cookery vessel comprising a flat bottom and a side wall, the interior of the vessel and an outer face (8) of the side wall being coated with a fluorinated polymer (5), the flat bottom being coated with an enamel coating (2), comprising the following stages:
   (a) applying a coating of enamel (2) to a central part of a metal disc (1), corresponding to an outer face of a bottom section of the vessel to be formed;
   (b) baking said enamel coating (2);
   (c) applying a continuous coating of fluorinated polymer to first and second faces (3, 4) of the disc (1) so that the enamel-coated part (2) is also covered by said coating of fluorinated polymer;
   (e) baking said coating of fluorinated polymer;
   (e) deep-drawing the disc (1) to the shape desired for the vessel and
   (f) removing the coating of fluorinated polymer from the enamel-coated part (2).

2. Process according to claim 1, further comprising chemically treating the first and second faces of the disc prior to step (a) to provide microcavities in said faces for enhancing the adhesion of the subsequently applied coatings (2) of enamel and (5) of flouronated polymer thereon.

3. Process according to claim 1, further comprising chemically treating the first and second faces of the enamelled disc after step (b) to provide microcavities in said faces for enhancing the adhesion of the subsequently applied coating (5) of flouronated polymer thereon.

* * * * *